US006732597B1

(12) United States Patent
Brandt, Jr.

(10) Patent No.: US 6,732,597 B1
(45) Date of Patent: May 11, 2004

(54) PRECISION GRAVIMETRIC FEEDER

(76) Inventor: Robert O. Brandt, Jr., 541 Wayne Dr., Wilmington, NC (US) 28403

( * ) Notice: Subject to any disclaimer, the term of this patent is extended or adjusted under 35 U.S.C. 154(b) by 0 days.

(21) Appl. No.: 10/294,401

(22) Filed: Nov. 14, 2002

(51) Int. Cl.⁷ ................................................. G01F 1/30
(52) U.S. Cl. ................................................. 73/861.73
(58) Field of Search ......................... 73/861.73, 861.74; 222/55, 56

(56) References Cited

U.S. PATENT DOCUMENTS

| | | | |
|---|---|---|---|
| 1,055,791 A | | 3/1913 | Pennington |
| 2,781,955 A | | 2/1957 | Kidd |
| 4,648,430 A | | 3/1987 | Di Gianfilippo et al. |
| 5,219,031 A | * | 6/1993 | Brandt, Jr. ................ 177/145 |
| 5,280,813 A | | 1/1994 | Jackson |
| 5,834,707 A | | 11/1998 | Wirth |
| 6,041,664 A | | 3/2000 | Hafner |
| 6,094,994 A | * | 8/2000 | Satake et al. ............ 73/861.73 |
| 6,168,305 B1 | | 1/2001 | Marmsater |
| 6,402,363 B1 | | 6/2002 | Maguire |
| 6,435,039 B1 | | 8/2002 | Hubert et al. |
| 6,441,322 B1 | | 8/2002 | Ash et al. |
| 6,640,158 B1 | * | 10/2003 | Brandt, Jr. ................ 700/240 |

* cited by examiner

Primary Examiner—Edward Lefkowitz
Assistant Examiner—Jewel Thompson
(74) Attorney, Agent, or Firm—MacCord Mason PLLC

(57) ABSTRACT

The present invention is an apparatus for precisely dispensing a desired weight of a particulate material from the outlet of a material hopper. The apparatus is made up of a trap chamber for collecting an initial weight that is less than the desired weight of the particulate material. The trap chamber includes an upper surface with an inlet in communication with the hopper outlet and a lower surface including an outlet. The surface area of the inlet is smaller than the surface area of the trap chamber outlet. The invention also includes a dispensing valve having a closed position covering the trap chamber lower outlet opening and an open position uncovering the trap chamber lower outlet opening. Other components include a flow meter for measuring an initial weight of particulate material comprising most of the desired weight, plus a measured fill weight of particulate material equal to the difference in the desired weight and the initial weight and an actuator in communication with the dispensing valve to open and close the valve. The actuator is responsive to a signal generated by the flow meter.

20 Claims, 4 Drawing Sheets

PRECISION GRAVIMETRIC FEEDER

BACKGROUND OF THE INVENTION (1) Field of the Invention

The present invention relates generally to bulk material feeders. More particularly, the invention is a precision gravimetric feeder for precisely dispensing solid particulate materials.

(2) Description of the Prior Art

Numerous solid particulate materials are packaged in receptacles for sale to the ultimate consumer or downstream processor. A brief exemplary listing of such materials include plastic and metal components and parts; food items, such as cereals, corn meal, rice, spices, soybeans, and a variety of other materials, such as tobacco, plastic pellets, etc. Exemplary receptacles include boxes, containers, pouches, packages, cartons, and bags.

Packages of these products may be labeled according to the number of items contained therein or by the weight of the contents. In practice, these products are packaged by a filling system that places a predetermined volume of the solid particulate material product into package containers. The filled packages are then weighed and subsequent packages are adjusted in volume until the proper weight per package is achieved.

This method of dispensing solid particulate material products is problematic in that it results in packages that are significantly under or over weight. Accordingly, the contents of these packages must be discarded or recycled back into the filling system. The problem is caused by the contents of the packages being placed into the package container before the contents are weighed, thus making it impossible to control particular package weights. What is needed is an apparatus that precisely measures the desired weight of solid particulate material as the material is being packaged.

SUMMARY OF THE INVENTION

It has been found that this need can be addressed by dispensing a measured initial weight of particulate material comprising most of the desired weight, plus a measured fill weight of particulate material equal to the difference in the desired weight and the initial weight. A precise fill weight is achieved by discharging the material through a small area opening to limit the quantity of material dispensed during a given time, with a dispensing valve shutting off the flow of fill material when the desired fill weight has passed through the opening.

More specifically, particulate material supplied from a material source such as a hopper is initially captured in a trap chamber positioned below the hopper. The trap chamber has a chamber inlet in communication with the hopper and an outlet in the lower part of the chamber to discharge material from the trap chamber. The chamber inlet is preferably above the chamber outlet, so that particulate material exiting the chamber inlet falls downward through the chamber outlet. Importantly, the area of the chamber inlet is smaller than the chamber outlet, e.g., the area of the inlet is from about 25% to about 75% of the area of the outlet.

An actuator-controlled valve having open and closed positions covers the chamber outlet. A flow meter is positioned to receive and weigh the initial material weight and fill material exiting the trap chamber. When the total weight of material measured reaches a predetermined value, the flow meter instructs the actuator to move the valve to its closed position. The total weight of material measured will be slightly less than the weight of material dispensed, since a small quantity of material will be between the valve and the flow meter at the time the signal is generated. Thus, the measured weight will be equal to the weight actually measured, plus this in-transit weight. Due to the relatively small size of the chamber inlet, the weight of material passing the valve at the time the signal is received is relatively small. Therefore, a high degree of accuracy is possible.

Operation of the present invention begins with the dispensing valve closed. As soon as an initial weight of material collects in the trap chamber, the dispensing valve can be rapidly opened, releasing the initial weight of material to engage the flow meter. The flow meter totals the initial weight of particulate material together with a trickle of particulate material that follows the release of the initial weight. As the particulate material total approaches the desired weight, the flow meter generates a signal that commands the valve actuator to close the dispensing valve, shutting off the trickle of particulate material flowing from the trap chamber outlet. The dispensed weight may be slightly less than the desired weight depending on the geometry of the trap chamber and the speed of the dispensing valve closure.

In particular, the trap chamber is provided to collect an initial weight of particulate material that is less than the desired weight of particulate material. Preferably, the trap chamber is sized to hold an initial weight of material that is less than the desired weight from about 50% to about 90%.

The dispensing valve has a closed position covering the trap chamber outlet and an open position uncovering the trap chamber outlet. Furthermore, a valve actuator is in communication with the valve to open and close the trap chamber outlet. The actuator can be, but is not limited to electromechanical, pneumatic or hydraulic types. The actuator responds to a signal generated by the flow meter. The signal can be an analog signal or a logic signal. In either case, the signal will command the actuator to close the trap chamber valve.

The preferred dispensing valve is made up of a housing having an aperture and a gate member that is adapted for sliding movement through the aperture between a valve-open position and a valve-closed position. The aperture of the gate valve is at least as large as the trap chamber outlet. In the valve-closed position, the gate member extends across the trap chamber outlet to close off the flow of particulate material. Preferably, the valve actuator can slide the gate member from the valve open position to the valve-closed position within at least about 50 milliseconds. Similarly, it is preferred that the actuator slides the gate member from the valve-closed position to the valve open position within at least about 50 milliseconds.

The flow meter can be a solid particle mass flow meter used as a dynamic weighing apparatus for accurately weighing particulate material while the particulate material is in motion. Preferably, the solid mass flow meter used as a part of the present invention can accurately weigh solid mass flow rates between the range of 5 lb/min. and 5000 lb/min. Particularly suitable solid particle mass flow meters are described in earlier U.S. Pat. No. 5,219,031, issued Jun. 15, 1993 and U.S. Pat. No. 5,230,251, issued Jul. 27, 1993, to the present inventor.

Generally, the solid particle mass flow meter is comprised of a curved weigh pan having inlet and outlet ends, and an inwardly curved surface extending between pan ends. The pan is positioned to receive a continuous stream of solid particulate material tangentially at the inlet end, i.e., the material stream is directed substantially perpendicular to the radius of curvature of the pan at the upper end. As a result, the material flows around the curved surface of the pan without impacting the pan, eliminating errors due to the movement of the pan under impact forces.

The pan is mounted on the distal end of an elongated support arm, with the proximal end of the arm being attached to a suitable support at a distance from the pan. To permit pan displacement, the arm is either flexible or is pivotally attaching at its proximal end. When material flows over the inwardly curved pan, an inward centripetal force, and corresponding outward force, is exerted causing the pan to move outwardly. This outward movement, corresponding to the weight, or change in weight, of material moving across the pan is measured by a displacement measurement instrument such as a transducer, which is positioned to measure the displacement of the pan.

Since the outward force exerted against the pan is due entirely to the centripetal force, and is independent of any impact or frictional forces, measurement is highly accurate and can be measured instantaneously. For optimal measurement independent of non-centripetal force factors, the pivot point of the arm is preferably located so that a line extending from the arm to the pan approximately midway between the inlet and outlet ends is perpendicular to the radius of curvature of the pan.

Operation of the invention typically begins with the dispensing valve in the valve-closed position. As material is loaded into the hopper, an initial weight of material collects in the trap chamber as particulate material dribbles through the trap chamber inlet. Once the trap chamber is adequately filled, precise dispensing of the particulate material may begin.

The dispensing process starts upon receipt of a signal that indicates an empty container is ready to be filled. The actuator responds to the signal by moving the valve to its open position, releasing the initial weight of particulate material. The initial weight of solid particulate material falls through the outlet of the trap chamber and is directed onto the solid mass flow meter's weigh pan tangential to the pan inlet end. The material moving across the pan surface is discharged from the pan outlet end preferably into a packaging receptacle. As soon as the initial weight is released, additional particulate material dribbles through the trap chamber inlet and into the trap chamber. However, the dispensing valve remains in the valve-open position and the trap chamber does not collect the dribble of particulate material. Instead, the dribble of material flows freely through the trap chamber outlet and, like the released initial weight, is directed onto the solid mass flow meter's weigh pan tangential to the pan inlet end. As the dribble of particulate material continues to flow, the solid mass flow meter measures the difference between the released weight and the desired weight. When the total measured weight of particulate material reaches a predetermined value, the solid mass flow meter generates a signal that commands the dispensing valve to abruptly close, thus gravimetrically dispensing a precise weight. The desired weight equals the predetermined value plus an in-transit amount of particulate material. The present invention is capable of dispensing weights that are within 0.1% of the desired weight. Due to the small surface area of the trap chamber relative to the trap chamber outlet, the flow rate of particle material exiting the trap chamber outlet after the release of the initial weight is significantly less than the average flow rate. As a result, errors involving valve closure speed and repeatability are greatly reduced. For example, a 75% reduction in flow rate after the release of the initial weight, results in a dispensing accuracy increase of ten-fold.

DETAILED DESCRIPTION OF THE PREFERRED EMBODIMENT

Figure 1:
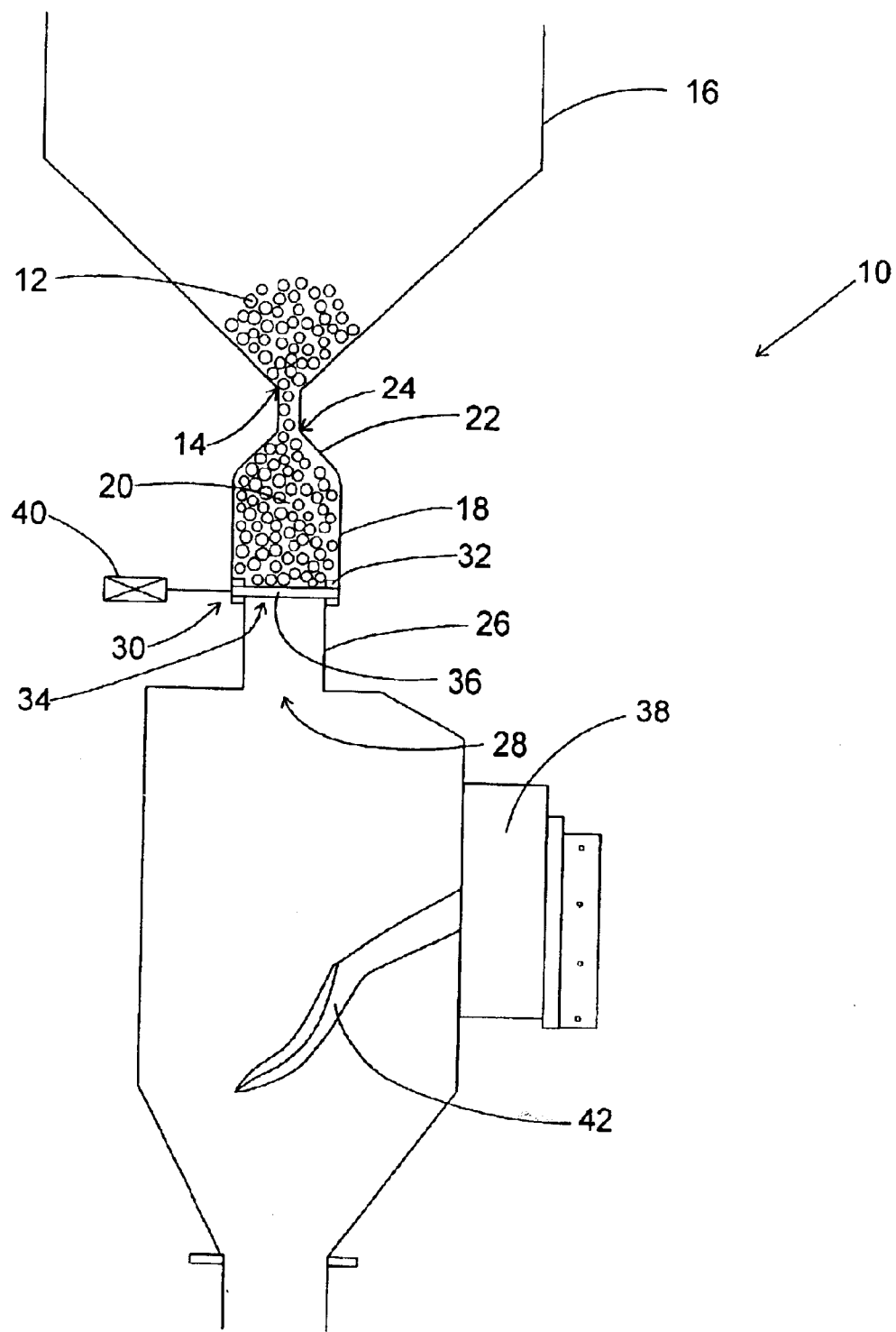
FIG. 1 is a sectional view of the components making up a preferred embodiment of the present invention with its sliding gate valve in the valve-closed position.

In the following description like reference characters designate like or corresponding parts throughout several views. It is to be understood that descriptive terms and the like are words of convenience and are not to be construed as limiting terms. It will be understood that the illustrations are for the purpose of describing preferred embodiments of the invention and are not intended to limit the invention thereto.

Referring now to FIG. 1, the present invention is an apparatus, generally 10, for precisely dispensing a desired weight of a particulate material 12 from the outlet 14 of a material hopper 16. A trap chamber 18 is provided to collect an initial weight 20 of particulate material that is less than the desired weight of particulate material 12. Trap chamber 18 has an upper surface 22 with an inlet 24 in communication with hopper outlet 14 and a lower surface 26 with an outlet 28. The surface area of inlet 24 is smaller than the surface area of outlet 28.

Figure 2:
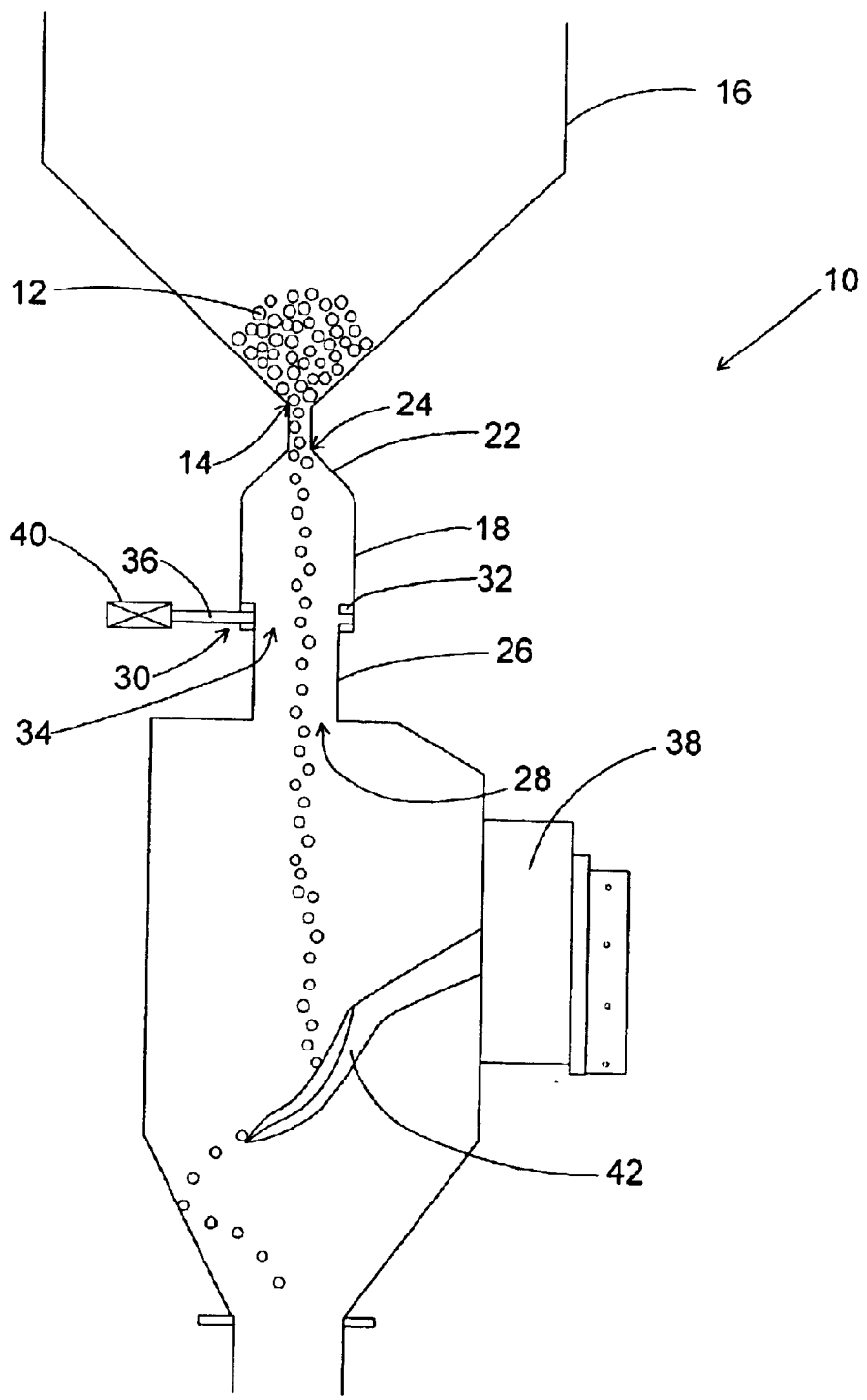
FIG. 2 is a sectional view of the preferred embodiment with the sliding gate valve in the valve-open position.

A dispensing valve 30 has a closed position for covering outlet 28 and an open position for uncovering outlet 28. Dispensing valve 30 can be a sliding gate type valve as illustrated in FIGS. 1 and 2. Valve 30 is made up of a housing 32 having an aperture 34 and a gate member 36 that is adapted for sliding movement through the aperture between a valve-open position and a valve-closed position. FIG. 1 shows valve 30 in valve-closed position, wherein gate member 36 extends across aperture 34 and into housing 32 to close off the flow of particulate material 12.

A solid particle mass flow meter 38 for measuring the difference between initial weight 20 and the desired weight is positioned for engagement by particulate material 12 exiting outlet 28. Flow meter 38 includes a weigh pan 42. Weigh pan 42 can be in the form of an elongate curved guide for guiding a stream of particulate material along a predetermined path. Furthermore, an actuator 40 is in communication with valve 30 to open and close outlet 28. Actuator 40 responds to a signal generated by flow meter 38. The signal can be an analog signal or a logic signal. In either case, the signal will command actuator 40 to close valve 30.

In operation, flow meter 38 instructs actuator 40 to move valve 30 to its closed position so that particulate material 12 can be loaded into material hopper 16. As material is loaded into hopper 16, an initial weight 20 of material collects in trap chamber 18 as a portion of particulate material 12 dribbles through trap chamber inlet 24. Once trap chamber 18 is adequately filled, precise dispensing of particulate material 12 may begin.

FIG. 2 shows valve 30 in the valve-open position. In this position, gate member 36 is withdrawn to a position that uncovers aperture 34, thus allowing material to fall through aperture 34. The dispensing process begins when actuator 40 moves gate member 36 to the valve-open position, releasing particulate material initial weight 20. Particulate material initial weight 20 falls through trap chamber outlet 28 engaging weigh pan 42 of solid particle flow meter 38. As initial weight 20 is released, additional particulate material dribbles through trap chamber inlet 24 and into trap chamber 18. However, valve gate member 36 remains in the valve-open position and the dribble of particulate material 12 is not collected. Rather, the dribble of particulate material 12 flows freely through trap chamber outlet 28 engaging weigh pan 42 of solid particle flow meter 38. As the dribble of particulate material continues to flow, solid particle flow meter 38 measures initial weight 20 of particulate material 12 comprising most of the desired weight, plus a measured fill weight of particulate material 12 equal to the difference in the desired weight and initial weight 20. When the total measured weight of particle material 12 equals a predetermined weight, solid particle flow meter 38 generates a signal that commands actuator 40 to abruptly close valve 30 by repositioning gate member 36 to the valve-closed position. In the valve-closed position, gate member 36 covers aperture 34 halting the flow of particulate material 12.

Figure 3:
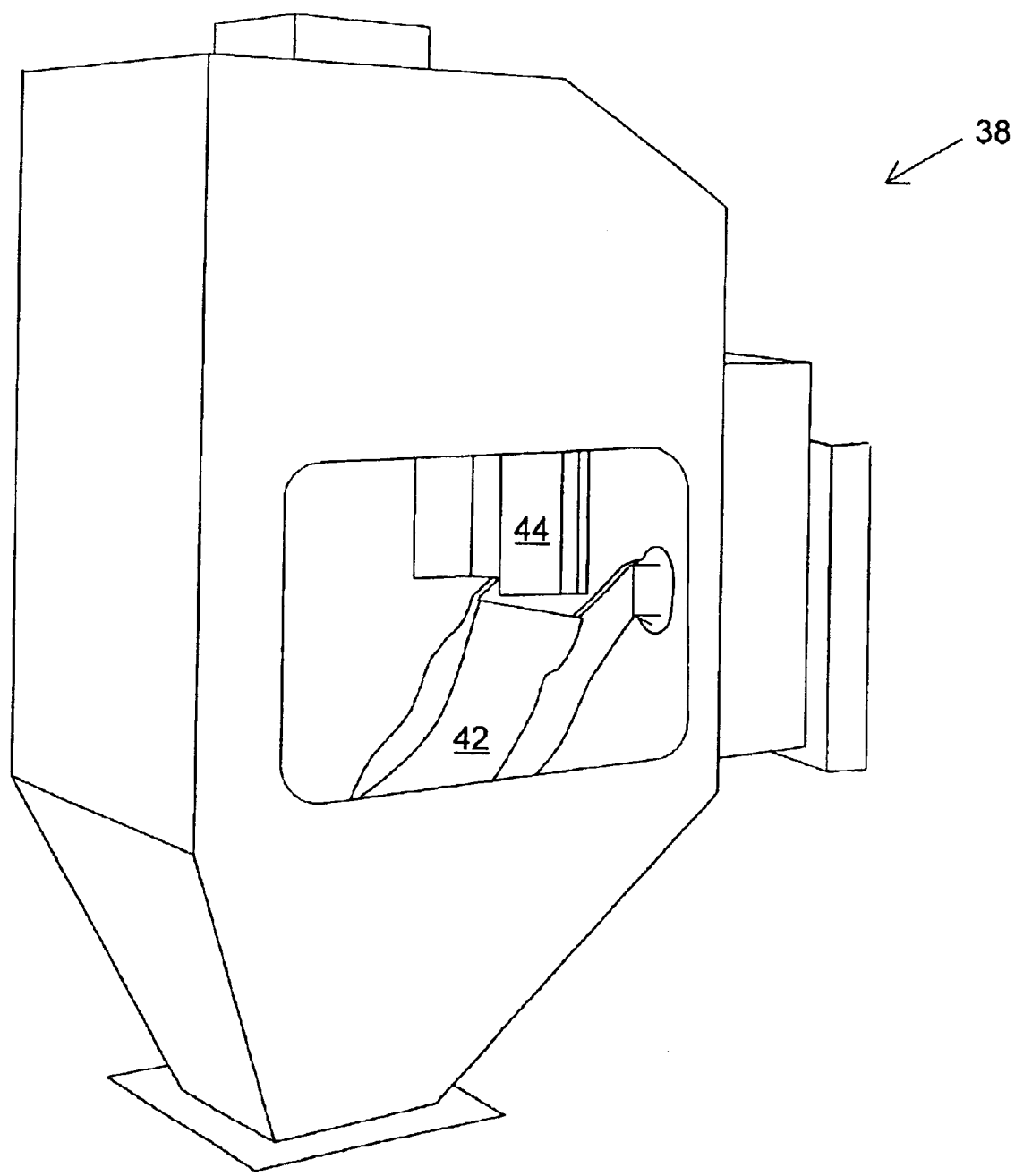
FIG. 3 is a perspective view of a solid particle mass flow meter preferred as the flow meter depicted in FIGS. 1 and 2.

FIG. 3 is a perspective view of flow meter 38. If desired, a material guide 44 can be positioned above weigh pan 42 to direct the initial flow of material onto weigh pan 42.

Figure 4:
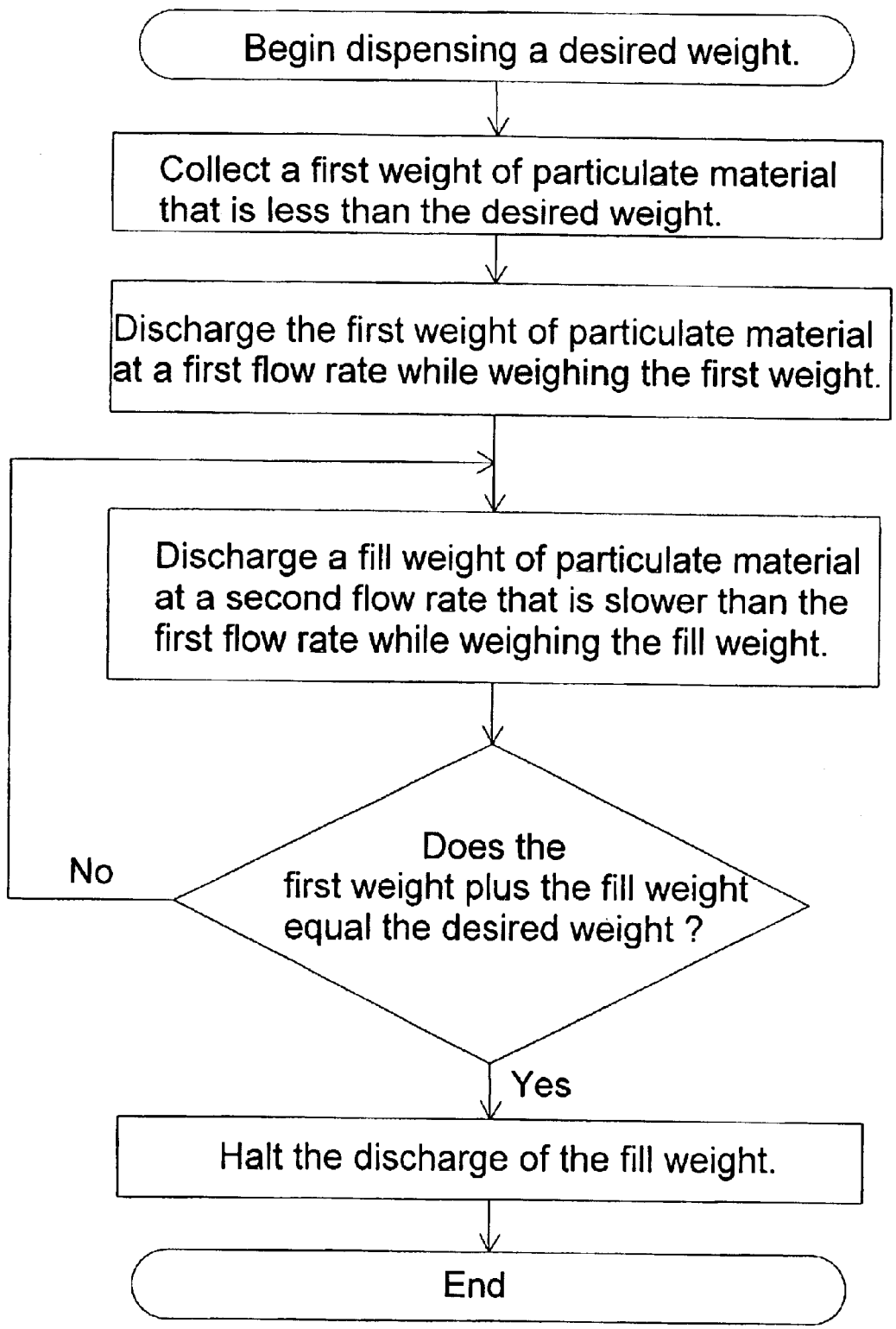
FIG. 4 is a flow chart of the preferred method for dispensing a desired amount of particulate material.

FIG. 4 is a flow chart of the preferred method for dispensing a desired weight of particulate material. The method begins with a step of collecting a first weight of particulate material that is less than the desired weight. Preferably, the first weight is collected into a trap chamber with dispensing valve like trap chamber 18 shown in FIGS. 1 and 2. The next step discharges the first weight of particulate material at a first flow rate while weighing the first weight of material. It is preferable that a dynamic weighing apparatus such as mass flow meter 38, shown in FIGS. 1, 2 and 3, measure the first weight.

The process continues by discharging a fill weight of particulate material at a second flow rate that is slower than the first flow rate. The material is concurrently weighed by the mass flow meter used to weigh the first weight of material. The material continues to flow at the second flow rate until the first weight plus the fill weight equals the desired weight. Since a small amount of material is in-transit when the desired weight is met, anticipating the moment the desired amount is dispensed can further enhance accuracy. In order to achieve the accuracy enhancement, the flow of fill material should be halted within at least about one hundred (100) milliseconds before the first weight and the fill weight equals the desired weight.

It will be apparent to one skilled in the art that many modifications and variations can be made to the present invention without departing from its spirit and scope. Therefore, the invention is not to be limited by the description of the preferred embodiment but is to be limited only by the scope of the following claims.

What is claimed is:

1. An apparatus for precisely dispensing a desired weight of a particulate material supplied by a material source, said apparatus comprising:

a) a trap chamber for collecting an initial weight of particulate material that is less than said desired weight of the particulate material, said trap chamber having an upper surface with an inlet in communication with said material source and a lower surface with a trap chamber outlet, wherein the surface area of said inlet is smaller than the surface area of said trap chamber outlet;

b) a dispensing valve having a closed position covering said trap chamber outlet and an open position uncovering said trap chamber outlet;

c) a flow meter for measuring said initial weight of particulate material, plus a measured fill weight of particulate material dispensed from said trap chamber following the dispensing of said initial weight; and d) an actuator in communication with said dispensing valve to close said valve, responsive to a signal generated by said flow meter when said initial weight plus said fill weight equals a predetermined value.

2. The apparatus of claim 1, wherein said trap chamber is sized to hold an initial weight of material that is less than said desired weight from about 50% to about 90%.

3. The apparatus of claim 1, wherein said weight measuring device is a solid particle mass flow meter having a weigh pan positioned for engagement by particulate material exiting said trap chamber outlet.

4. The solid particle mass flow meter of claim 3, wherein said weigh pan is an elongate curved guide means for guiding a stream of particulate material along a predetermined path.

5. The apparatus of claim 1, wherein the ratio between the surface area of the trap chamber outlet and surface area of the trap chamber inlet is from about 4:1 to about 4:3.

6. The apparatus of claim 1, wherein said valve is comprised of a housing having an aperture and a gate member which is adapted for sliding movement through the aperture between a valve-open position, wherein the gate member is withdrawn from the housing, and a valve-closed position, wherein the gate member extends across the aperture and into the housing to close off the flow of particulate material through said aperture.

7. The valve of claim 6, wherein said gate member slides from the valve-open position to the valve-closed position within at least about 50 milliseconds.

8. The valve of claim 6, wherein said gate member slides from the valve-closed position to the valve-open position within at least about 50 milliseconds.

9. A method for precisely discharging a desired weight of particulate material, said method comprising:

a) collecting a first weight of particulate material that is less than said desired weight;

b) discharging said first weight at a first flow rate while weighing said first weight;

c) discharging a fill weight of particulate material at a second flow rate while weighing said fill weight, said second flow rate being less than said first flow rate; and d) halting discharge of said fill material when said first weight and said fill weight equals said desired weight.

10. The method of claim 9, wherein said first weight of material that is less than said desired weight from about 50% to about 90%.

11. The method of claim 9, wherein said weighing of said first weight and said fill material is performed by a solid mass flow meter.

12. The method of claim 9, wherein said halting discharge of said fill material is performed by closing the gate of a sliding gate valve.

13. The method of claim 9, wherein said first discharge rate is from about 125% to about 400% greater than said second discharge rate.

14. The method of claim 9, wherein said halting discharge of said fill material begins within at least about 100 milliseconds before said first weight and said fill weight equals said desired weight.

15. An apparatus for precisely dispensing a desired weight of a particulate material, said apparatus comprising:
   a) a material hopper having an outlet;
   b) a trap chamber for collecting an initial weight of material that is less than said desired weight from about 50% to about 90%, said trap chamber having an upper surface with an inlet in communication with said hopper outlet and a lower surface with an outlet, wherein the surface area of said inlet is smaller than the surface area of said trap chamber outlet;
   c) a dispensing valve for trapping and then releasing an initial weight of particulate material from said trap chamber, wherein said valve is comprised of a housing having an aperture and a gate member which is adapted for sliding movement through the aperture between a valve-open position, wherein the gate member is withdrawn from the housing, and a valve-closed position, wherein the gate member extends across the aperture and into the housing to close off the flow of particulate material through said aperture;
   d) a solid particle mass flow meter having a weigh pan for measuring said initial weight of particulate material, plus a measured fill weight of particulate material dispensed from said trap chamber following the dispensing of said initial weight; and
   e) an actuator in communication with said dispensing valve to open and close said valve, said actuator being responsive to a signal generated by said solid particle mass flow meter when said initial weight plus said fill weight equals a predetermined value.

16. The apparatus of claim 15, wherein said valve aperture is at least as large as said trap chamber outlet.

17. The apparatus of claim 15, wherein the ratio between the surface area of the said trap chamber outlet and surface area of the trap chamber inlet opening is from about 4:1 to about 4:3.

18. The apparatus of claim 15, wherein said solid mass flow meter is a dynamic weighing apparatus for accurately weighing particulate material while the particulate material is in motion.

19. The apparatus of claim 15, wherein said solid mass flow meter can accurately weigh solid mass flow rates between the range of 5 lb/min and 5000 lb/min.

20. The apparatus of claim 15, wherein a dribble flow rate of particulate material is at least 25% less than the flow rate of the released initial weight.

* * * * *